United States Patent [19]

Tilley, Sr.

[11] Patent Number: 5,138,886
[45] Date of Patent: Aug. 18, 1992

[54] ELECTRONIC MANOMETER

[76] Inventor: Hilton R. Tilley, Sr., 103 Gyles Rd., Aiken, S.C. 29801

[21] Appl. No.: 588,736

[22] Filed: Sep. 27, 1990

[51] Int. Cl.⁵ .......................... G01L 7/18; G01L 9/00
[52] U.S. Cl. .................................. 73/749; 73/304 R; 73/708
[58] Field of Search ...................... 73/749, 708, 304 R; 324/520, 644, 645, 646

[56] References Cited

U.S. PATENT DOCUMENTS

| | | | |
|---|---|---|---|
| 3,589,196 | 6/1971 | Van Dyck et al. | 73/290 V |
| 3,803,545 | 4/1974 | Van Dyck et al. | 340/10 |
| 3,908,129 | 9/1975 | Akers | 250/577 |
| 4,055,982 | 11/1977 | Ter-Minassian et al. | 374/10 |
| 4,495,807 | 2/1983 | Field et al. | 73/290 R |
| 4,631,960 | 12/1986 | Wogerbauer | 73/712 |
| 4,739,663 | 4/1988 | Peterson | 73/703 |
| 4,872,483 | 10/1989 | Shah | 73/753 |

OTHER PUBLICATIONS

"Mercury Barometers and Manometers" by W. G. Brombacher et al., Commerce, Natl. Bur. of Standards, May 20, 1960.

"Studies and Research Concerning BNFP, RF Level Measurement Evaluation" by H. Tilley, Sep. 1980, Allied-General Nuclear Services (p. 5).

"A Reliable Automatic Liquid Nitrogen Filling System" D. A. Landis et al., IEEE 1986.

*Primary Examiner*—Donald O. Woodiel
*Attorney, Agent, or Firm*—Pollock, Vande Sande & Priddy

[57] ABSTRACT

An electronic manometer for measuring pressure differentials between first and second outlets of a U tube supporting a column of mercury. The U tube includes for each arm a coaxial feedline which is terminated by the column of mercury. The coaxial feedlines are connected to first and second oscillators where they serve as the frequency determining circuit element of the oscillators. The wavelength of each oscillator frequency of oscillation is directly proportional to the height of the mercury column. A frequency counter and computer are connected to measure this wavelength, and apply any necessary corrective factors to the measurement.

12 Claims, 2 Drawing Sheets

ELECTRONIC MANOMETER

The present invention relates to mercury manometers for measuring pressure differentials. Specifically, a U-tube manometer is described wherein at least one of the legs of the manometer serves as a radio frequency feed line terminated by a column of mercury, the length of the feed line indicating a pressure differential applied to the manometer.

Manometers are widely used in industry for accurately measuring pressure. These manometers include a U-tube which is filled with a liquid such as mercury. The column of mercury changes position within the U-tube structure in accordance with the pressure differential between open ends of the U-tube. The height of the liquid column is related to the absolute pressure differential, $p2 - p1$ as $\rho GH$, where $\rho$ represents the density of the liquid, G the acceleration due to gravity, and H the height of the column of mercury.

As set forth in a publication by the National Bureau of Standards, "Mercury Barometers and Manometers", W. P. Brombacher, D.P. Johnson and J. L. Cross, these manometers may be used to measure pressure differences to as high as 24 ATM (360 psi). However, such manometers are subject to error when attempts at very precision measurements of pressure differentials are made.

A chief limitation on the accuracy of such manometers is the difficulty in making precision measurements of the mercury column height. As set forth in the foregoing document, many techniques for establishing this height have been proposed in the past. These include using a sight glass for accurately sighting the level of the mercury. A sighting ring is provided in front of and behind the meniscus formed at the top of the column of the mercury. The sighting ring is usually connected to a vernier and accurately positioned with respect to the meniscus in the mercury column. The position of the sighting ring is accurately read once the sighting ring has been accurately sighted with respect to the meniscus.

Other techniques for measuring the height of mercury include observing the meniscus level with a microscope, the use of electrical contacts to sense the level of the mercury, as well as photocell detection for indicating the position of the mercury surface.

Other limitations on the accuracy of such manometers include the change in physical characteristics of the mercury. The density is known to vary with temperature, as well as with changes due to different pressures of the mercury.

The present invention provides a solution to both of these problems, wherein the height of the mercury column is accurately detected and changes in physical characteristics for the mercury are compensated by applying appropriate correction factors.

SUMMARY OF THE INVENTION

It is an object of this invention to accurately measure the height of a mercury column.

It is a more specific object of this invention to accurately measure the column of mercury in a U-tube manometer.

It is yet another object of this invention to apply calibration factors to the measured height of the column of mercury in a manometer to obtain a corrected pressure measurement.

These and other objects of the invention are provided by an electronic manometer capable of measuring pressure differentials experienced by conventional manometers. In accordance with the invention, a U-tube structure is provided wherein at least one of the arms of the U-tube represents a coaxial radio frequency feedline. The coaxial radio frequency feedline is terminated by the mercury column. As pressure differentials applied between each side of the U-tube structure change, the positions of the columns of mercury change, thus lengthening one and shortening the other column height. Electrically, this appears to the open ends of the manometer tubes as shorted coaxial feedlines, the length of each feedline changing with the pressure differential on each open end of the manometer tubes.

In accordance with a preferred embodiment of the invention, first and second radio frequency oscillators are connected to two coaxial feedlines which serve as a pair of arms of the U-tube manometer. The pair of arms are connected at the bottom so that a continuous column of mercury may be supported in the two arms and connection piece. Each of the coaxial feedlines is connected to first and second radio frequency oscillators, wherein the frequency of the oscillators changes as the length of the shorted radio frequency feedline changes. The changes in mercury column height in each coaxial feedline is reflected as a change in wavelength for the shorted coaxial radio frequency feedlines. By employing two oscillators whose oscillation frequency is primarily determined by the length of each coaxial radio frequency feedline, it is possible to equate the change in oscillator frequency for each of the oscillators as a pressure differential.

In accordance with the preferred embodiment of the invention, the change in frequency is measured by first and second frequency counters and applied to a microcomputer. The microcomputer may receive as inputs from the operator various correction factors, such as the temperature, vapor pressure, or acceleration due to gravity for a specific measurement site. Each of these correction factors may be applied to the resulting calculation of the mercury column height to accurately determine the pressure differential.

DESCRIPTION OF THE PREFERRED EMBODIMENT

Figure 1:
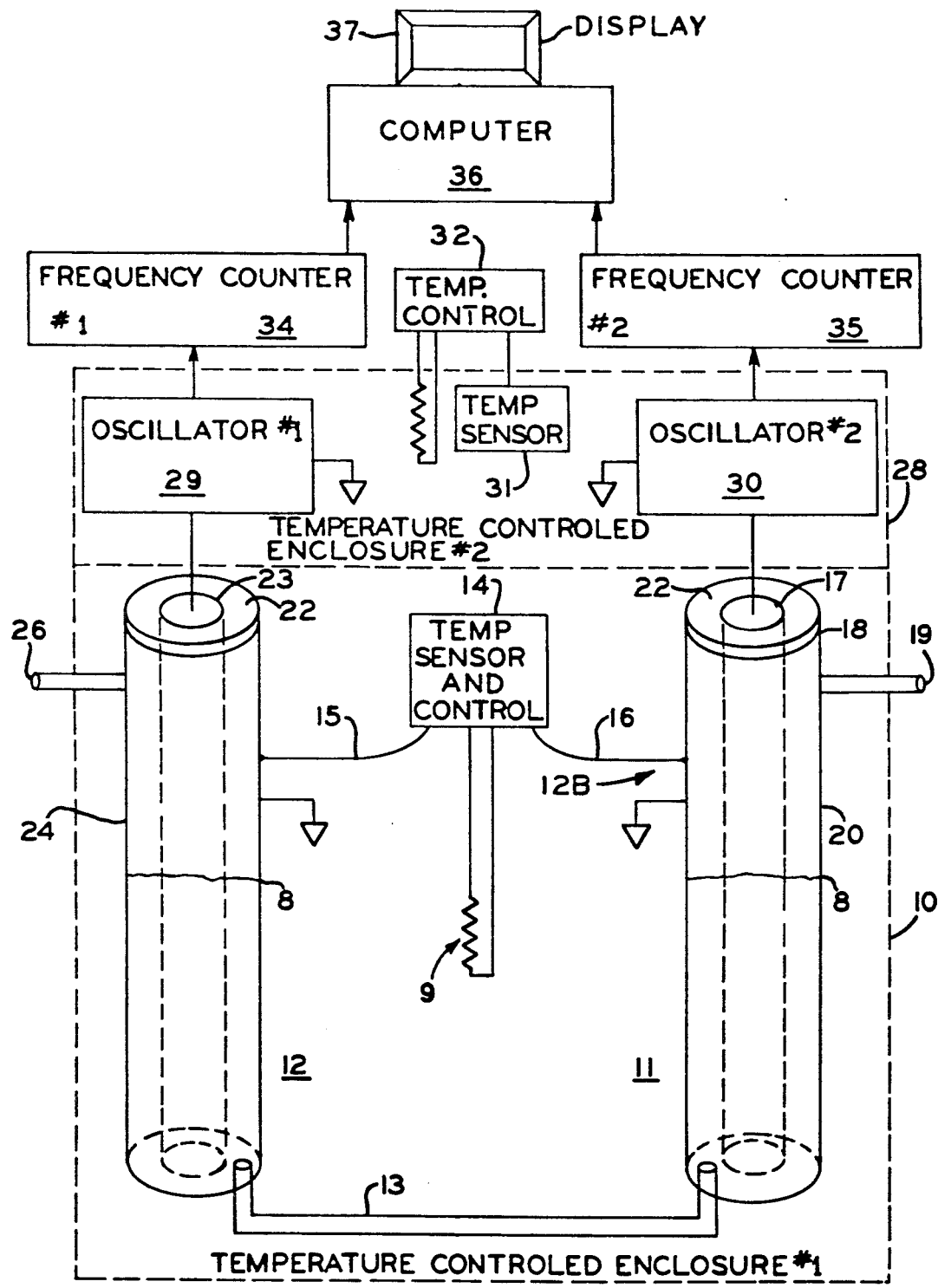
FIG. 1 illustrates a block diagram of an electronic U-tube manometer in accordance with a preferred embodiment of the invention.

Referring now to FIG. 1, there is shown a preferred embodiment of the invention. FIG. 1 illustrates a U-tube manometer comprising first and second legs 11 and 12, connected by a bottom conduit 13. Conduit 13 and first and second legs 11 and 12 form a continuous fluid circuit, wherein mercury may be supported and which freely moves to a position determined by the pressure differential between pressure outlets 19 and 26. Pressure outlet 19 may be connected to a reference pressure, and 26 may be connected to an unknown pressure to be measured. The U-tube structure of FIG. 1 operates as a conventional manometer in that the column of mercury in each of legs 11 and 12 may freely move, depending on the pressure differential applied to the manometer.

However, the legs of the manometer 11 and 12 are radio frequency coaxial feedline structures. These include an outer shell 20 and 24 containing an inner cylindrical conductor 17 and 23. The inner conductor 17 and 23 and outer shell 20 and 24 are spaced apart to provide a radio frequency coaxial feedline structure. The inner conductors 17 and 23 pass through insulating pressure-tight seals 22. Although the example noted above uses mercury in a U-tube manometer, the principles of operation will also be the same using any other liquid metal as the working fluid. Also, instead of coaxial radio frequency feed lines, open wire radio frequency feed lines extending into glass tubes can be used. In this case, the liquid metal would provide an electrical short between the lines. The U-tube structure is not the only structure in which the above principle will function. The level in a single tube cistern-type manometer can also be measured using this method.

Connected to each member 11 and 12 are first and second oscillators 29 and 30. Each of the oscillators 29 and 30 have a frequency primarily determined by the length of the radio frequency coaxial structure represented by members 11 and 12. The wavelength of the oscillating frequency for each of oscillators 29 and 30 varies proportionally with the length of the terminating radio frequency coaxial structure represented by members 11 and 12. Thus, a column of mercury within each of the members 11 and 12 presents a shorted coaxial line structure to each of oscillators 29 and 30. The mercury 8 within each of the tubes represents a movable short-circuit termination for each of the coaxial radio frequency members 11 and 12. The wavelength of the frequency of oscillation for each of the oscillators 29 and 30 is directly proportional to the length of the radio frequency coaxial structure of members 11 and 12 which lies above the level of mercury.

It is therefore clear to those skilled in the art that the wavelength of each of oscillators 29 and 30 will differ by an amount directly proportional to the difference in height of mercury 8 in each of the members 11 and 12. Thus, as the pressure differential between outlets 19 and 26 increases, the differential wavelength represented by oscillators 29 and 30 will also increase:

$$29 - 30 = H_{12} - H_{11}$$

A pair of standard frequency counters 34 and 35 are provided to accurately measure the frequency of each of oscillators 29 and 30. Each of frequency counters 34 and 35 has an output which may be a digital output connected to a pair of I/0 ports of a computer 36, having a standard display 37.

The computer 36 is capable of relating the difference in frequencies measured for each of oscillators 29 and 30 into a differential column height for the mercury within each of members 11 and 12. Additionally, the computer 36 may apply numerous correction factors in accordance with operator supplied data such as ambient temperature T0, local acceleration of gravity G, to the differential height measurement H, represented by the differences in frequencies within each of frequency counters 34 and 35. Referring to the aforesaid document published by the National Bureau of Standards, various tables may be entered into the computer 36 to permit correction factors to be derived based on any operator supplied conditions, such as temperature or local acceleration of gravity for correcting the resulting measurement.

The accuracy of the readings derived from the use of the apparatus of FIG. 1 may be further enhanced by maintaining the U-tube structure within a temperature controlled housing 10. The temperature controlled housing 10 includes a temperature sensor circuit and control circuit 14, along with a heating resistor 9. Using sensors 15 and 16 connected to temperature sensor and control unit 14, it is possible to maintain the environment of the U-tube structure at a precise temperature which may also be supplied as an input condition to the computer 36 to make the aforesaid corrections. Likewise, as is known to those skilled in the art, the stability of oscillators 29 and 30 may be maintained by a second temperature controlled enclosure 28 having temperature sensor 31 disposed therein. A temperature controller 32 and heating resistor 33 can maintain the oscillators 29 and 30 at a temperature to precisely control their frequency of oscillation so that the only substantial influence on the frequency of oscillation is the height of the mercury within each of the radio frequency coaxial structures represented by members 11 and 12.

The results of measuring the differential height H represented by the difference in height of the mercury columns in each of members 11 and 12 may be presented on display 37. This may be displayed as a height differential or as a computed pressure differential based on the height differential. The computer may also be programmed to compute changes in height for each of the mercury columns in members 11 and 12. As these changes are complementary in a normal operating manometer, they may be used as a check on manometer performance.

Figure 2:
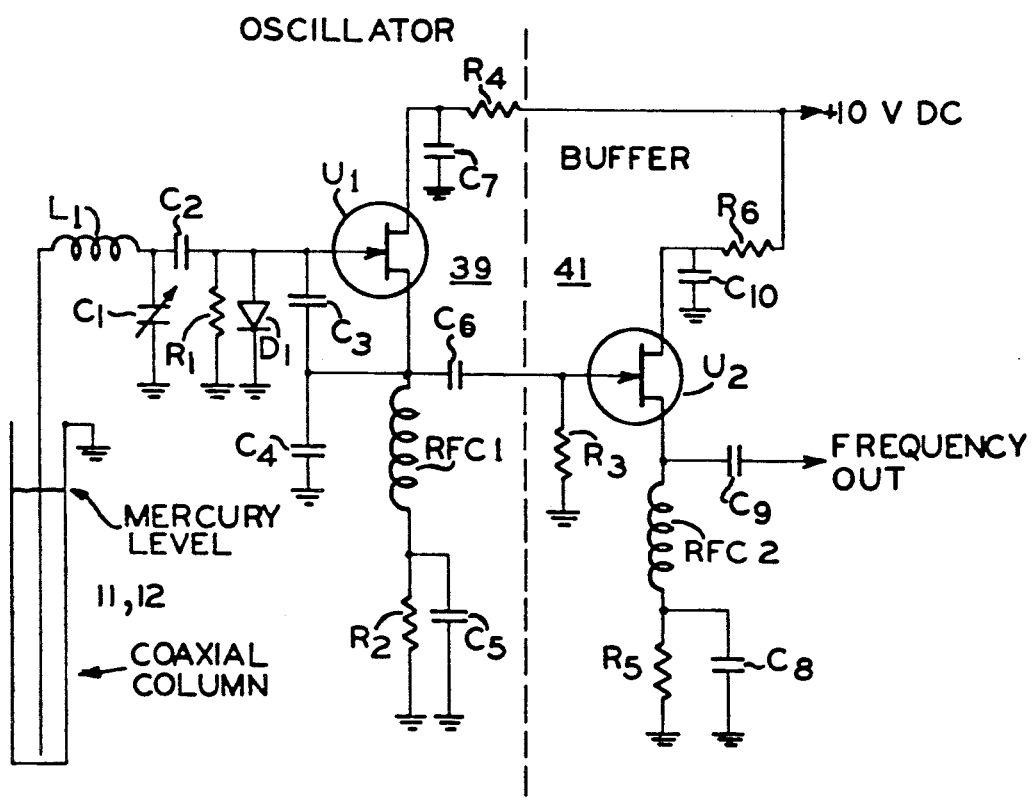
FIG. 2 illustrates in detail one example of an oscillator circuit which may be employed for oscillators 29 and 30.

Referring to FIG. 2, there is shown an oscillator circuit which may be used as either of oscillators 29 and 30. The oscillator shown is configured to have a frequency of oscillation between 11.1 MHz and 11.8 MHz. The oscillator comprises an FET oscillator circuit 39 and a buffer circuit 41 for deloading the oscillator circuit, and providing a sufficient level signal for each of the frequency counters 34 and 35. The various components shown are known to those skilled in the art, and the values of the capacitors and resistors shown are given in the table below.

TABLE 1

| | |
|---|---|
| $C_1$ = .8-20 pf trimmer | |
| $C_2$ = 300 pf | |
| $C_3$ = 330 pf | $R_1$ = 100k, ¼ w |
| $C_4$ = 180 pf | $R_2$ = 540Ω, ¼ w   $U_1$ = 2N4416A |
| $C_5$ = .1 μf | $R_3$ = 100k, ¼ w   $U_2$ = 2N4416A |
| $C_6$ = 33 pf | $R_4$ = 100Ω, ¼ w   $RFC_1$ = 1.0 mH choke |
| $C_7$ = .1 μf | $R_5$ = 540Ω, ¼ w   $RFC_2$ = 1.0 mH choke |
| $C_8$ = .1 μf | $R_6$ = 100Ω, ¼ w   $L_1$ = .6 to .8 μH |
| $C_9$ = 33 pf | $P_1$ = 1N914 |
| $C_{10}$ = .1 μf | coaxial column 11, 12 |
| | 36" long, center conductor ¼" O.D. Rod |
| | Outer conductor, 1¼" sched. 40 pipe, |
| | 1.600" I.D. |
| | Impedance of column = 111 ohms |

The oscillator circuit of FIG. 2 is only exemplary, and need not be limiting. Further, the frequency of oscillation is also exemplary, and certain applications may call for other oscillation frequency ranges.

The foregoing embodiments represented by FIGS. 1 and 2 may be used for high pressure measurements, when each of the members 11 and 12 are so configured such that the outer shell 20 and 24 is a tube structure capable of withstanding expected pressure differentials, and port 19 is closed. In fact, there appears to be no limitation on the pressure ranges in which the U-tube manometer of FIG. 1 may be employed vis a vis pressure ranges obtainable by conventional U-tube manometers.

If the outlet pressure port 19 on leg 11 is closed with air or other gas trapped in leg 11, the manometer response to pressure at the inlet port 26 will be non-linear, since the mercury column in leg 11 will be compressing the trapped gas in leg 11 as the mercury rises. Each additional increase in pressure at inlet port 26 will result in smaller and smaller changes in column length. This seeming disadvantage, however, has the advantage that the manometer is now capable of measuring any arbitrarily high pressure by properly sizing the outer tube wall thickness, and design pressure rating of the insulating feedthrough center conductors in the top of each leg.

Thus, there has been disclosed with respect to one embodiment, a novel electronic manometer capable of providing temperature corrected pressure measurements. Those skilled in the art will recognize yet other embodiments defined more particularly by the claims which follow.

What is claimed is:

1. An electronic manometer for measuring pressure differentials comprising:
    a first vertically oriented sealed tube member having an inlet for connecting to a source of pressure to be measured;
    a second vertically oriented sealed tube member having an inlet connected to a source of reference pressure;
    a connecting member providing a fluid connection between lower ends of said first and second vertically oriented tube members;
    first and second metal rods coaxially supported in said first and second vertically oriented tube members, spaced apart therefrom, and extending through an insulating seal forming with said tubes first and second coaxial radio frequency feedlines;
    a column of mercury disposed in said first and second vertically oriented tube members having a relative height in said tube members determined by a pressure differential between said inlets, said column of mercury providing a moving termination for each first and second vertically oriented tube member for changing the relative length of each coaxial radio frequency feedline;
    a first radio frequency oscillator connected to said first vertically oriented tube member and said first rod member, said oscillator having a frequency controlled by the length of said first coaxial radio frequency feedlines;
    a second radio frequency oscillator connected to said second vertically oriented tube member and said second rod member, said second radio frequency oscillator having a frequency controlled by the length of said second coaxial radio frequency feedlines; and,
    means for measuring the relative frequencies of said first and second oscillator's frequency of operation, representing the height of said mercury columns in said coaxial radio frequency feedlines.

2. The electronic manometer of claim 1, wherein said means for measuring the relative frequency of said oscillators comprises:
    a frequency measuring means connected to each of said oscillators for producing first and second signals representing the frequency of each oscillator; and,
    a computer means connected to receive each of said first and second signals, and compute from each of said first and second signals the length of each respective terminated coaxial feedline.

3. The electronic manometer of claim 2, wherein said computer means computes the respective change in coaxial feedline lengths, and compares said respective changes as a check on said manometer performance.

4. An electronic manometer comprising:
    first and second vertically disposed tube members connected together at a lower end by a fluid channel, said tube members containing a common column of mercury which changes height in each of said tubes depending on the relative pressure differential applied to upper ends of said first and second vertically disposed tube members, at least one of said tube members having an inner conductor forming a coaxial feedline terminated by said mercury column;
    oscillator means connected to said at least one of said coaxial feedlines, producing a signal having a frequency controlled by the length of said one coaxial feedline above said column of mercury; and,
    computing means connected to said oscillator means for computing said length of said one coaxial feedline above said column of mercury from said signal frequency.

5. The electronic manometer of claim 4 further comprising an electronic frequency counter connected to receive said oscillator signal and provide a digital signal to said computing means representing said oscillator frequency.

6. The electronic manometer of claim 4 wherein both of said tubes are coaxial feedlines.

7. The electronic manometer of claim 6 further comprising a second oscillator means connected to a remaining of said coaxial feedlines, producing a signal having a frequency and wavelength proportional to the length of said remaining coaxial feedlines.

8. The electronic manometer of claim 7 wherein said computing means compares changes in column height as a check on the performance of the manometer.

9. The electronic manometer of claim 4 further comprising a display means for displaying an indication of the length of said one coaxial feedline.

10. The electronic manometer of claim 4 wherein said computer means calculates a relative pressure differential on upper ends of said tubes based on said length of said coaxial feedline above said column of mercury.

11. The electronic manometer of claim 4 wherein said computer includes a table of correction factors to apply to said length measurements.

12. The electronic manometer of claim 4 wherein said table of correction factors includes a correction factor relating to the ambient temperature of said mercury column.

* * * * *